Jan. 13, 1931.   W. H. WOOD   1,788,936
LENS
Filed Oct. 3, 1927   3 Sheets-Sheet 1

William H. Wood
Inventor
By Smith and Freeman
Attorneys

Jan. 13, 1931.    W. H. WOOD    1,788,936
LENS
Filed Oct. 3, 1927    3 Sheets-Sheet 2

William H. Wood
Inventor
By Smith and Freeman
Attorneys

Jan. 13, 1931. W. H. WOOD 1,788,936
LENS
Filed Oct. 3, 1927 3 Sheets-Sheet 3

William H. Wood
Inventor
By Smith and Freeman
Attorneys

Patented Jan. 13, 1931

1,788,936

UNITED STATES PATENT OFFICE

WILLIAM H. WOOD, OF SOUTH EUCLID, OHIO

LENS

Application filed October 3, 1927. Serial No. 223,575.

This invention relates to vehicle headlights and the general objects are the provision of a new and improved lens together with a new improved tool for making the same. For controlling the rays from vehicle headlights glass lenses have been developed possessing differences of refraction from point to point depending upon the nature and distribution of the light rays desired and the nature of the light source employed. This patterning is effected by forming different portions of the glass surface with ribs depressions, corrugations, knobs, and prisms of varying shape and size. Such lenses are always produced by compressing the hot glass between metal dies, and owing to the high temperature and the erosive and corrosive nature of the glass, it is necessary to redress the faces of the dies at short intervals. While it is perfectly possible, solely from the optical aspect, to produce any desired distribution of light beam by a large number of different patterns of lens, these different patterns are not equally acceptable commercially owing to differences in the cost of redressing the die faces which may vary all the way from perhaps one-tenth cent per lens up to four or five cents per lens, the latter figure being, of course, prohibitive. The principal object of my invention is to provide certain new and useful improvements in lenses which shall secure the optical effect desired by the use of expedients which facilitate the original manufacture and subsequent redressing of the dies by enabling the same to be effected by suitable machinery in a simple and expeditious manner; other objects of the invention relate to a particular patterning of the lens whereby certain particular advantages of light control and distribution are produced, especially in connection with a two filament type of lamp bulb. This application is a continuation in part of my previous application filed November 29, 1926, Serial No. 151,310.

Figure 1:
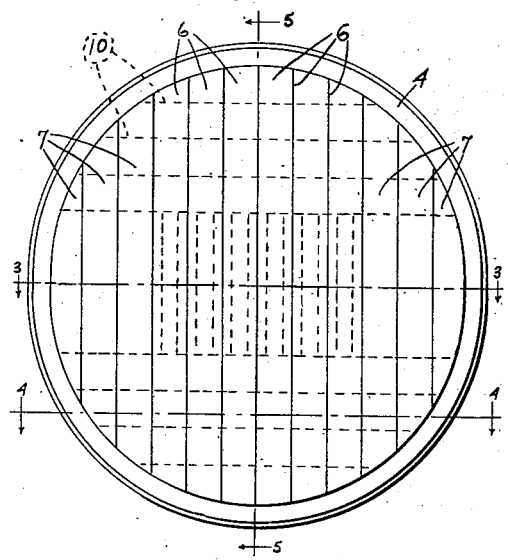
Figure 7:
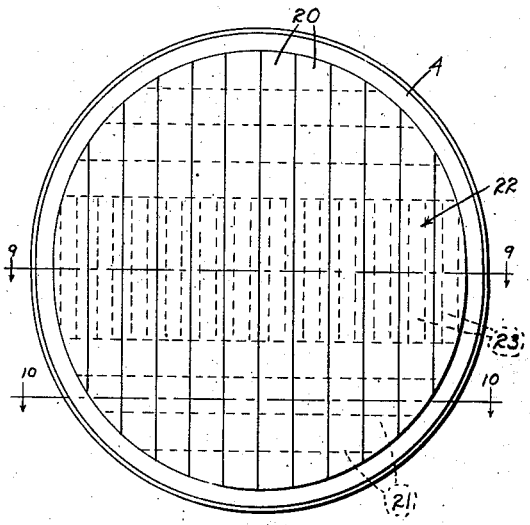
Figure 2:
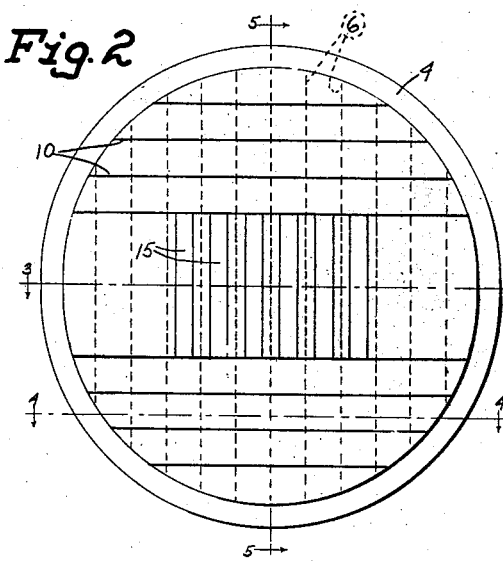
Figure 8:
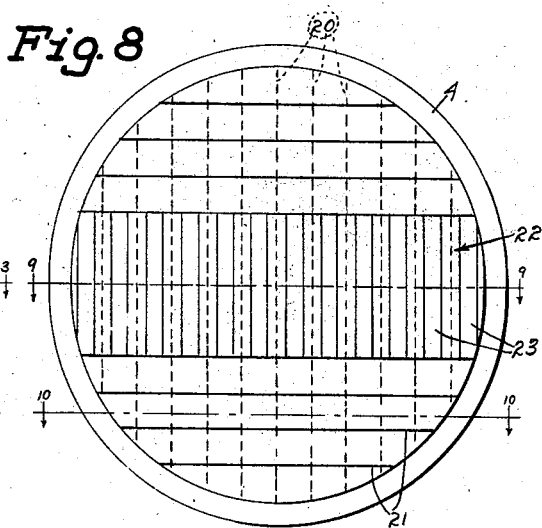
Figure 3:
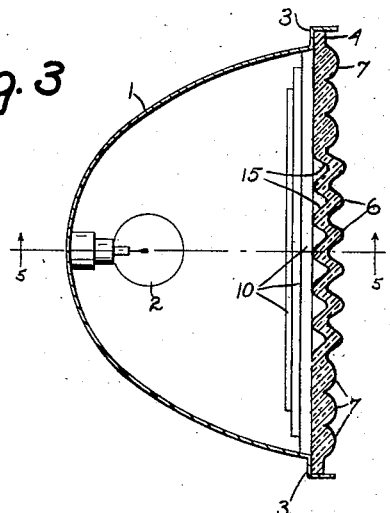
Figure 9:
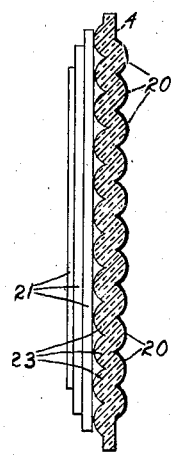
Figure 4:
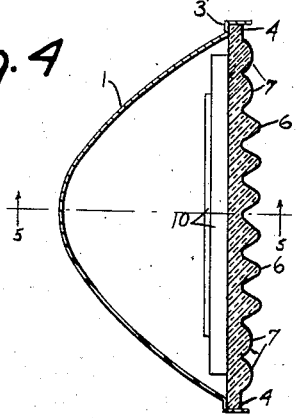
Figure 10:
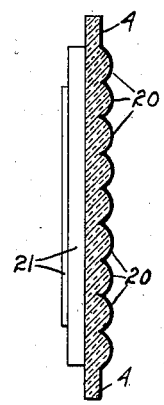
Figure 5:
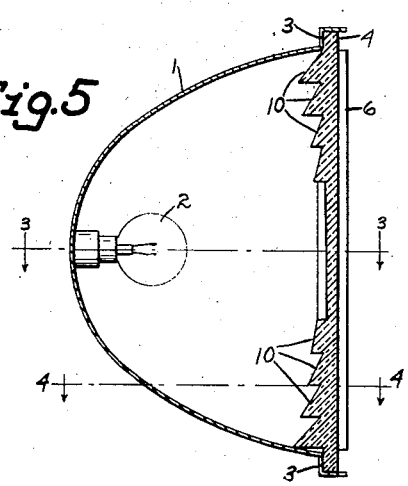
Figure 6:
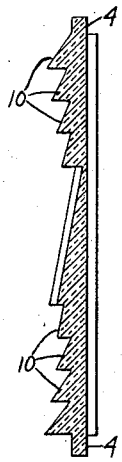
Figure 11:
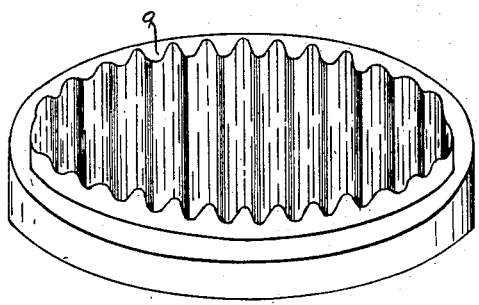
Figure 12:
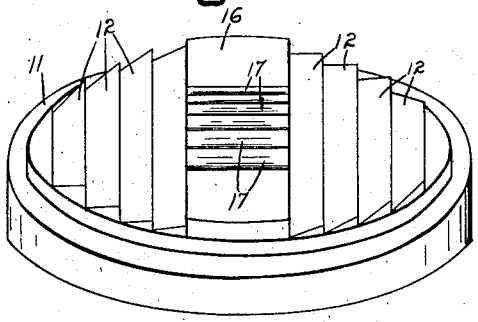
Figure 13:
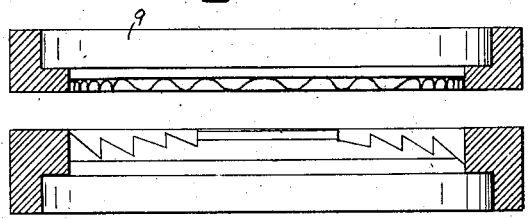
Figure 14:
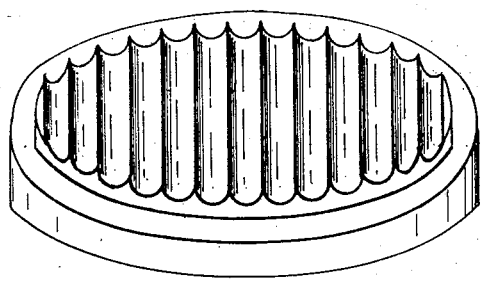
Figure 15:
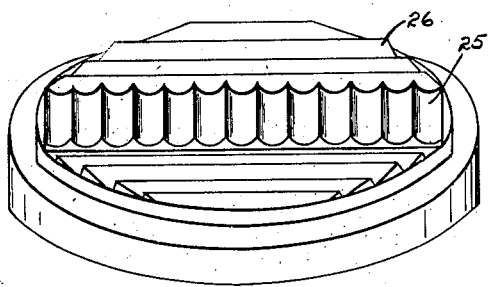

In the drawings accompanying this specification and forming a part of this application I have shown certain illustrative embodiments of my invention but without intent to limit myself only to the features therein shown. In these drawings Fig. 1 is a front elevation and Fig. 2 a rear elevation of a preferred form of headlight lens; Figs. 3, 4, and 5 are sectional views corresponding to the similarly numbered lines occurring in Figs. 1, 2, 3, 4, and 5; Fig 6 illustrates a modified form of lens usable in the device of Figs. 1 to 5 inclusive; Figs. 7 and 8 are, respectively, a front view and a back view of a modified form of lens embodying my improvements; Figs. 9 and 10 are sectional views corresponding to the lines 9—9 and 10—10 respectively of Figs. 7 and 8; Fig. 11 is a perspective view of the die member employed to produce the front face of the lens shown in Figs. 1 to 5 inclusive; Fig. 12 is a perspective view of the die member employed to produce a rear face of the lens shown in Figs. 1 to 5 inclusive; Fig. 13 is an edge view showing said die members in operative position; Fig. 14 is a perspective view of the die member employed in making the face of the lens shown in Figs. 7 to 10 inclusive; and Fig. 15 is a perspective view of the die member employed in producing the rear face of the last-named lens.

Substantially all vehicle headlights comprise a reflector 1, and lamp bulb 2 suitably mounted therein, the mouth of the reflector being formed with a suitable seat 3 for the rim 4 of a lens of transparent refracting material, generally glass. For purposes of the present description it will be assumed that the reflector 1 comprises one or more paraboloids and that the lamp bulb 2 has a concentrated type of filament suitably located therein, which means in the case of a single filament that the same coincides substantially with the focal point of the reflector and in the case of a double filament lamp that the said filaments are located one above and one below the focal point and in the same vertical line therewith as illustrated at 5—5 in Fig. 5. In general, however, my improvements are equally applicable to lenses intended for use with all types of reflectors, although the particular form shown in Figs. 1 and 2 hereof is particularly useful in connection with a two filament lamp and a reflector having at least the side portions of parabola type.

According to a preferred form of my invention the outer face of the lens is formed with a plurality of vertical parallel striations which extend unbroken from top to bottom of the lens; uniformity of angle and depth of the different striations is not especially important, but it is important that each striation should run unbroken from one margin to the other. In these views I have shown these striations as consisting of ribs or flutes and have also shown the flutes 6—6 at the middle of the lens as more refractive than those 7, 7 near the margins, for example, the flutes 6—6 being 30° spread and the flutes 7—7, 10° spread. Such a lens face is made by pressing the molten glass between dies, one face of which is constructed as shown at 9 in Fig. 11. Such a die can readily be made originally by a simple milling or grinding operation which can be repeated for dressing purposes. Indeed for dressing it is entirely possible to provide the necessary number of grinding wheels or milling cutters on a single shaft and cause the die to make but a single passage by the same.

The opposite side of the lens shown in Figs. 1 to 5, inclusive, is provided at top and bottom with horizontal prisms 10—10 which in the case of a two filament lamp are preferably caused to increase gradually in slope towards the upper and lower limbs of the reflector in order to control the rays which would otherwise stray unduly, as set forth in my application Serial No. 119,557, filed June 30, 1926. This portion of the lens is produced by a die having transverse ribs of appropriate shape indicated at 12—12 in Fig. 12, which although they be unequal in size and slant as among themselves, yet run unbroken from one side of the lens to the other and hence can be made and dressed in the same manner as described for the die member 9 shown in Fig. 11. However, I have further found it desirable to reduce the lateral diffusion throughout at least a part of the central horizontal zone and to do this without interrupting the uniformity of the ribs 6 or 7 I form the rear of the lens at the region where the diffusion is to be reduced with vertical striations, which in the form shown in Fig. 3 consist of grooves 15 parallel to each other and to the striation 6—6 or 7, 7 and shaped so as to reduce or even substantially to neutralize the optical effect thereof. In order to produce this configuration the central zone of the die member 11 shown in Fig. 12 is formed with a flat portion 16 elevated above the tops of the adjacent ribs 12, and on this elevated portion are formed a plurality of projecting ribs 17 adapted to produce the grooves desired. Owing to the elevation of the portion 16 above the ribs 12 it will be seen that the ribs and grooves 17 can readily be made and dressed without interference from the transverse elements. In Figs. 1, 2, 3, and 12 I have shown the grooves 15 as confined to a region near the middle of the lens, but it will be understood that this area is not invariable.

The lens illustrated in Fig. 6 is similar to that illustrated in Fig. 5 expecting that in Fig. 5 each vertical section exhibits uniform thickness throughout the central horizontal zone, that is to say between the upper and lower sets of prisms 10—10; while in Fig. 6 each vertical section on the lens exhibits a constantly varying thickness throughout the central portion to effect a downward deflection of the light rays which traverse this portion of the lens.

According to another form of my invention, the front face of the lens is formed with a plurality of spaced vertical ribs 20 as shown in Figs. 7 to 10, inclusive, and the rear face with horizontal prisms 21—21, said prisms being confined to the upper and lower portions, while the horizontal central zone 22 is formed with striations consisting of vertical ribs 23 so arranged as to neutralize the effect of the ribs 20, in this case throughout the entire width of the lens. The dies for producing the last described lenses are illustrated in Figs. 14 and 15, that for the face of the lens being merely fluted from side to side as before, and that for the rear of the lens having a fluted central zone portion 25 and a transversely grooved portion 26, the portion 25 being sufficiently high within the portion 26 to provide tool clearance.

It will be understood that many other modifications in the patterning can be made within the purview of my inventive idea and that I do not limit myself to any details of shape, design, arrangement, or configuration except as specifically recited in my several claims and rendered necessary by the prior state of the art.

Having thus described my invention what I claim is:

1. A lens provided with parallel striations over one section of its one surface adapted to deflect laterally light passing therethrough, and also provided with parallel striations of different contour over another section of said one surface to diffuse light passing therethrough, but in a different degree, and also provided with parallel striations over a portion of its other surface opposite the whole of neither of said sections to reduce the degree of diffusion produced by the conformation of the surface opposite thereto.

2. A lens provided with parallel striations over the central strip section of its one surface adapted to deflect laterally light passing therethrough, and also over the lateral strip section of said one surface to diffuse light passing therethrough, but in a different degree, and also provided with parallel striations over a portion of the central strip section of its other surface opposite the whole of neither of said first sections to reduce the degree of diffusion over that portion of said first section which is opposite thereto.

3. A lens formed on the one face with ribs which traverse the same from side to side and formed on one part of the opposite face with ribs which are perpendicular to said first ribs and traverse the lens from side to side and formed on another part of such opposite face with light deflecting striations which are parallel to said first ribs and reduce the diffusing effect thereof.

4. A lens having one face formed with ribs which traverse the same unbroken from side to side and having its opposite face formed with light-deflecting striations which are parallel to said ribs and other light-deflecting striations which are not parallel to said ribs, the parallel and non-parallel striations being located at different distances from any plane which is parallel to the lens face.

5. A lens having its opposite faces covered, the one wholly and the other partially, with light-deflecting striations which run unbroken from side to side, one face of said lens being formed with striations which terminate short of the sides of said lens and which extend at an angle to the other striations on the same face of said lens and in a different plane therefrom, part of the striations on the one face being parallel to those on the other face.

6. A lens having one of its faces ribbed in different directions, the ribs which extend in one direction and those which extend in a different direction, lying wholly upon opposite sides of a single plane which is parallel to said face.

7. A lens having one of its faces formed with light-deflecting striations which run unbroken from one side of the lens to the other, and the opposite face formed with light-deflecting striations which are parallel to said first striations but terminate short of the sides of said lens, said last striations being located in a different stratum as compared with the plane of the lens from the adjacent portions of the same face.

8. A lens having one of its faces formed with light-deflecting striations which run unbroken from one side of the lens to the other, and the opposite face formed with light-deflecting striations which are parallel to said first striations but terminate short of the sides of said lens, said last striations being located in a plane which is closer to the plane of said first ribs than the adjacent portions of the same face.

9. A headlight lens having one face formed with vertical light-deflecting striations which run unbroken from top to bottom, the other face being formed at its horizontal central zone with vertical light-deflecting striations which reduce the diffusing effect of said first light-deflecting striations, the remaining portions of said other face having refracting provisions located wholly outside of the space defined by parallel planes which include the inner and outer extremities of the striations in said central zone.

10. A headlight lens having one face formed with vertical light-deflecting striations which run unbroken from top to bottom, the other face being formed at its upper and lower portions with horizontal light-deflecting striations, and between such upper and lower portions with a region of vertical light-deflecting striations, said last striations being located entirely outside of a space defined by parallel planes defined by the outermost and innermost portions of said first horizontal striations.

11. A headlight lens having one face formed with vertical light-deflecting striations which run unbroken from top to bottom, the other face being formed at its upper and lower portions with horizontal light-deflecting striations and between such upper and lower portions with a region of vertical light-deflecting striations covering only a part of said zone, said last striations being of a shape to reduce the diffusing effect of the striations on the face opposite thereto.

In testimony whereof I hereunto affix my signature.

WILLIAM H. WOOD.